(12) United States Patent
Trevett et al.

(10) Patent No.: US 9,316,436 B2
(45) Date of Patent: Apr. 19, 2016

(54) CLEARING PRECIPITATION

(71) Applicant: Echovista Systems Limited, Great Yarmouth, Norfolk (GB)

(72) Inventors: David Robert Murray Trevett, Poole (GB); Patrick Naven Trevett, Poole (GB)

(73) Assignee: ECHOVISTA GMBH, Seligenstadt (DE)

(*) Notice: Subject to any disclaimer, the term of this patent is extended or adjusted under 35 U.S.C. 154(b) by 359 days.

(21) Appl. No.: 13/938,417

(22) Filed: Jul. 10, 2013

(65) Prior Publication Data
US 2013/0298419 A1 Nov. 14, 2013

Related U.S. Application Data

(63) Continuation of application No. PCT/GB2012/050006, filed on Jan. 5, 2012.

(30) Foreign Application Priority Data

Jan. 10, 2011 (GB) .................................. 1100290.4
Oct. 25, 2011 (GB) .................................. 1118369.6

(51) Int. Cl.
*B60S 1/02* (2006.01)
*F26B 5/02* (2006.01)

(52) U.S. Cl.
CPC .... *F26B 5/02* (2013.01); *B60S 1/02* (2013.01)

(58) Field of Classification Search
CPC ................. B60S 1/02; B60S 1/54; F26B 5/02
USPC ................................... 296/96.15; 15/250.001
See application file for complete search history.

(56) References Cited

U.S. PATENT DOCUMENTS

| | | | | |
|---|---|---|---|---|
| 3,171,683 | A | * | 3/1965 | Ludwig ..................... B60S 1/02 15/250.001 |
| 3,289,060 | A | * | 11/1966 | Rubin .................... B64C 1/1476 244/121 |
| 4,768,256 | A | | 9/1988 | Motoda |
| 5,007,722 | A | | 4/1991 | Mori |
| 5,012,593 | A | | 5/1991 | Okada |
| 5,025,187 | A | | 6/1991 | Fujie |
| 5,136,199 | A | | 8/1992 | Kawai |
| 5,136,425 | A | | 8/1992 | Fujie |

(Continued)

FOREIGN PATENT DOCUMENTS

| | | |
|---|---|---|
| DE | 4435941 A1 | 4/1995 |
| DE | 10005341 A1 | 8/2001 |

(Continued)

OTHER PUBLICATIONS

Wei Liang et al, AIP Conf. Proc. 1474, "Droplet Propulsion on Non-piezoelectric Substrates Induced by Lamb Waves" 391 (2012).

(Continued)

*Primary Examiner* — Gregory Blankenship
(74) *Attorney, Agent, or Firm* — EIP US LLP

(57) ABSTRACT

A method of clearing precipitation from a surface of a window comprises ultrasonically vaporizing the precipitation. A vehicle windscreen, for example, has transducers distributed around the edge and bonded to the windscreen to insonify it. The transducers are energized by a drive system.

19 Claims, 3 Drawing Sheets

(56) References Cited

U.S. PATENT DOCUMENTS

| | | | |
|---|---|---|---|
| 5,148,312 A | 9/1992 | Kawai | |
| 5,166,825 A | 11/1992 | Fujie | |
| 5,233,467 A | 8/1993 | Ogasawara | |
| 5,274,876 A * | 1/1994 | Wehrspann | B60S 1/0497 15/250.001 |
| 5,475,530 A * | 12/1995 | Fujie | H05B 3/845 219/219 |
| 5,591,945 A * | 1/1997 | Kent | G06F 3/0418 178/18.04 |
| 5,724,186 A * | 3/1998 | Collier | B08B 7/028 15/250.03 |
| 6,743,298 B2 * | 6/2004 | Schmid | B60S 1/0491 134/6 |
| 7,080,872 B1 * | 7/2006 | Simonowits | B60S 1/54 15/250.001 |
| 7,537,262 B2 * | 5/2009 | Terakawa | B60J 9/04 296/95.1 |
| 8,146,866 B2 | 4/2012 | Tenebre | |
| 8,217,554 B2 | 7/2012 | Royer, Jr. | |
| 2006/0193049 A1 * | 8/2006 | Chen | B60R 1/0602 359/509 |
| 2008/0201888 A1 * | 8/2008 | Nakai | A47L 1/00 15/250.001 |
| 2010/0230991 A1 * | 9/2010 | Fioravanti | B60J 1/2005 296/96.15 |
| 2013/0060380 A1 * | 3/2013 | Ryu | A47L 1/03 700/254 |
| 2014/0117701 A1 * | 5/2014 | Davis | A42B 3/26 296/96.15 |

FOREIGN PATENT DOCUMENTS

| | | | | |
|---|---|---|---|---|
| DE | 10103197 A1 | 7/2002 | | |
| DE | 202004019608 U1 | 3/2005 | | |
| DE | 102007045136 A1 | 3/2008 | | |
| DE | 102011107871 A1 | 1/2013 | | |
| FR | 1308877 A | 11/1962 | | |
| GB | 1037787 A | 8/1966 | | |
| GB | 2387107 A1 | 10/2003 | | |
| GB | 2426434 A | 11/2006 | | |
| JP | 57070754 A | 1/1982 | | |
| JP | 1190561 A2 | 7/1989 | | |
| JP | 4-15146 | * | 1/1992 | B60S 1/02 |
| JP | 4-15146 A | 1/1992 | | |
| JP | 5024464 U1 | 3/1993 | | |
| JP | 5262204 A | 10/1993 | | |
| JP | 7315178 A | 5/1995 | | |
| JP | 8140898 A | 6/1996 | | |
| JP | 11128859 A2 | 5/1999 | | |
| JP | 2001359287 A2 | 12/2001 | | |
| JP | 2006200334 A | 8/2006 | | |
| WO | 0068047 A1 | 5/2000 | | |
| WO | 2005065850 A1 | 7/2005 | | |

OTHER PUBLICATIONS

Martin Schmitt et al, Sensors "Detection and Removal of Droplets on Nonpiezoelectric Substrates via Mode Conversion of Lamb Waves" 2010 IEEE, pp. 304-308.

Martin Schmitt et al, Ultrasonics Symposium (IUS), "Propulsion of droplets on non-piezoelectric substrates via mode conversion of Lamb waves" 2009 IEEE International, pp. 1640-1643.

Gerhard Lindner et al, Ultrasonics Symposium, 2007 "Acoustic Surface Wave Induced Propagation of Liquids in Open Channels" IEEE, pp. 2331-2334.

Gerhard Lindner, J. Phys. D: Appl. Phys. 41 "Sensors and actuators based on surface acoustic waves propagating along solid—liquid interfaces" (2008).

Vikrant Palan and W. Steve Shepard Jr. "Enhanced water removal in a fuel cell stack by droplet atomization using structural and acoustic excitation" Published online Jan. 19, 2006.

W. Soluch and T. Wrobel, Electronics Letters "Continuous operation of SAW atomiser" Mar. 20, 2003 vol. 39 No. 6, pp. 582-583.

J. Bennès, et al. 2005 IEEE Ultrasonics Symposium, "Droplet ejector using surface acoustic waves" pp. 823-826.

V.G. Mozhaev and A. V. Zyrianova, 2004 IEEE Ultrasonics Symposium, "Analysis of Bidirectional Vibrational Transport of Small Objects by Periodic Wave Trains of Pulses" pp. 1169-1172.

W. Soluch and T. Wrobel, Electronics Letters "Low driving power SAW atomiser" Nov. 23, 2006 vol. 42 No. 24.

H. Zou, et al. Microelectronic Test Structures (ICMTS), "Modification and Characterisation of Material Hydrophobicity for Surface Acoustic Wave Driven Microfluidics" 2012 IEEE International Conference, pp. 61-65.

Y.Q. Fu, et al. IEEE Sensors 2007 Conference, "SAW Streaming in ZnO Surface Acoustic Wave Micromixer and Micropump" pp. 478-483.

D. S. Brodie, et al. Applied Physics Letters 99, 153704 "Shear horizontal surface acoustic wave induced microfluidic flow" (2011).

P. Deepu, et al. Applied Physics Letters 101, 143108 "Spreading and atomization of droplets on a vibrating surface in a standing pressure field" (2012).

Felicidade Moreira, et al. IEEE Sensors Journal, vol. 8, No. 8, "Theoretical and Experimental Identification of Love Wave Frequency Peaks in Layered Structure ZnO/Quartz SAW Device" Aug. 2008.

Ryan P. Hodgson, et al. Applied Physics Letters 94, 024102 "Transmitting high power rf acoustic radiation via fluid couplants into superstrates for microfluidics" (2009).

James Friend, et al. 2009 IEEE International Ultrasonics Symposium Proceedings, "Unraveling Interfacial Jetting Phenomena Induced by Focused Surface Acoustic Waves" pp. 811-814.

Ricky T. Tjeung, et al. Proceedings of the 2011 6th IEEE International Conference on Nano/Micro Engineered and.Molecular Systems "ZnO/sapphire based layered surface acoustic wave devices for microfluidic applications" Feb. 20-23, 2011.

Dale Ensminger and Leonard J. Bond. Figure 12.16 in chapter 13, Ultrasonics—Fundamental, Technologies, and Applications. Copyright 1988.

Humidifier—Wikipedia http://en.wikipedia.org/wiki/Humidifier extract Nov. 24, 2011.

* cited by examiner

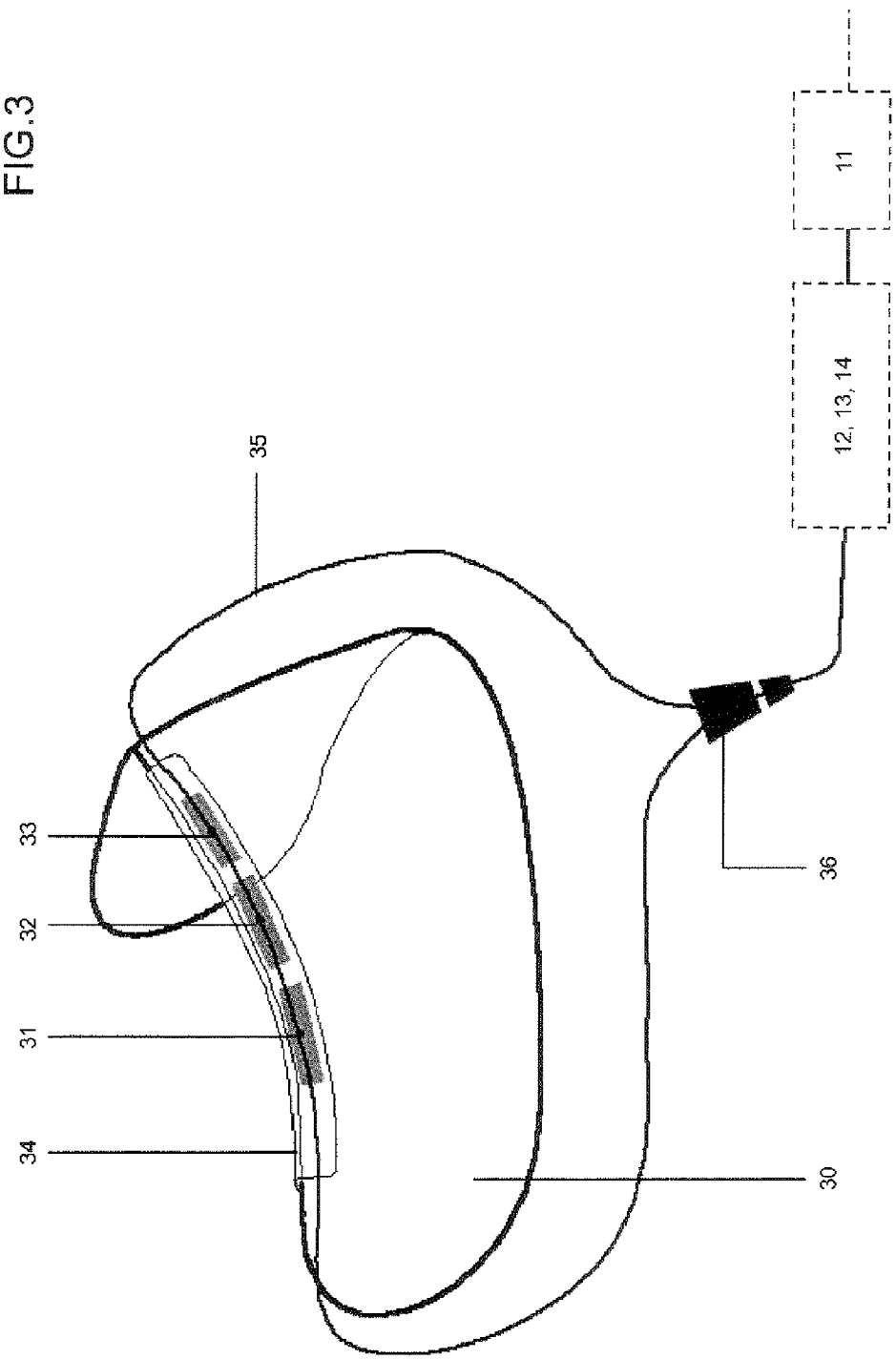

CLEARING PRECIPITATION

CROSS-REFERENCE TO RELATED APPLICATIONS

This application is a continuation under 35 U.S.C. §120 of International Application No. PCT/GB2012/050006, filed Jan. 5, 2012, and published in the English language by the International Bureau as Publication No. WO 2012/095643 A1 on Jul. 19, 2012, which claims priority to: (1) GB Application No. 1118369.6, filed on Oct. 25, 2011; and (2) GB Application No. 1100290.4, filed on Jan. 10, 2011. Each of the above referenced patent applications is hereby incorporated by reference in its entirety.

BACKGROUND OF THE INVENTION

1. Field of the Invention

The present application relates to a method of and apparatus for clearing precipitation from windows. Embodiments of the invention relate to clearing precipitation from the windscreen of a vehicle.

2. Description of the Related Technology

The current windscreen wiper, invented by Mary Anderson, in 1903, has served the motorist well for almost a century, however, despite many improvements over the years, it has limitations such as a narrow field of view for driver and passenger, smearing, juddering, lifting at speed, scratching the windscreen surface and the vital need for renewal of the wiper blade. The driver's vision is even further impaired when driving at speed at night in heavy rain, especially with regard to oncoming vehicle headlights.

When it rains, water droplets, which normally cause the transmission of light through the windscreen to be distorted, make it virtually impossible to see the road clearly. The conventional windscreen wipers intermittently clear an area directly in front of the driver and passenger at controlled speeds; however in heavy rain, the driver has a clear view for only short periods as the wipers traverse the windscreen. This results in the driver effectively driving partially blind and could miss seeing a pedestrian or cyclist or another vehicle, especially at night.

Various prior proposals for using clearing precipitation using ultrasound are disclosed in, GB2387107 and U.S. Pat. No. 4,768,256 amongst other proposals. It is known from DE20 2004 019 608 U1 to provide ultrasonic transducers on windscreen wipers which move across a windscreen. It is known from GB1037787 to insonify ultrasound from the corners or edges of the windscreen where the transducers are not bonded or in a physical contact with the windscreen, which results in significant energy loss. As far as is known to the current applicants, no prior proposal using ultrasound has been put into practice.

SUMMARY

In accordance with one aspect of the present invention, there is provided a method of clearing precipitation from a surface of a window, the method comprising ultrasonically vaporising the precipitation.

In accordance with another aspect, there is provided an apparatus for clearing precipitation from the surface of a window, the apparatus comprising means for ultrasonically vaporising the precipitation.

In accordance with a further aspect of the present invention, there is provided a method of clearing precipitation from a surface of a window, the method comprising ultrasonically reducing surface tension between the surface and the precipitation and ejecting the precipitation from the surface.

In accordance with a yet further aspect, there is provided an apparatus for clearing precipitation from the surface of a window, the apparatus comprising means for ultrasonically reducing surface tension between the surface and the precipitation and ejecting the precipitation from the surface.

In an embodiment of the invention the window is a windscreen or other window of a vehicle.

In an embodiment of the invention the window is a visor as used for example by a motorcyclist.

In an embodiment of the invention the window is a window for, or of, a building.

Embodiments of the apparatus disclosed herein include no moving parts unlike a conventional windscreen wiper of a vehicle. These embodiments also have no parts like wiper blades which are subject to wear and need regular replacement.

In an embodiment of the invention, precipitation, for example rain, is cleared from a windscreen by simultaneously reducing the surface tension between the windscreen and water droplets and vaporizing the rain droplets the instant they hit the windscreen by a process we refer to as cold steam.

Further features and advantages of the invention will become apparent from the following description of preferred embodiments of the invention, given by way of example only, which is made with reference to the accompanying drawings.

BRIEF DESCRIPTION OF THE DRAWINGS

FIG. 3 is a schematic block diagram of a visor which incorporates an embodiment of the invention.

DETAILED DESCRIPTION OF CERTAIN INVENTIVE EMBODIMENTS

Overview

An illustrative example of an "Ultrasound Windscreen System" (UWS) in accordance with one or more embodiments of the present invention has the purpose of removing precipitation from a window, for example the windscreen of a vehicle and/or the side windows and/or the rear window of a vehicle. In at least one embodiment, the system has no moving parts, ensuring good reliability and long life. It may be digitally controlled using solid state technology and offers virtual seamless control variables. When applied to a vehicle, it may be used with a standard vehicle windscreen.

Another embodiment may also be capable of defrosting, demisting and/or cleaning the windscreen.

The Ultrasound Windscreen System (UWS) may be used, with some modifications, for cars, buses, trucks, trains, aircraft, emergency vehicles, riot vehicles, or visors as used by motorcyclists.

The Ultrasound Windscreen System (UWS) may be used instead of a windscreen wiper system. However it may also be used in addition to a conventional wiper system if required.

In an embodiment of the invention, rain is cleared from the windscreen by simultaneously reducing the surface tension between the windscreen and water droplets and vaporizing the rain droplets the instant they hit the windscreen. The process should not be confused with cavitation, which is a different phenomenon and could harm the windscreen. The resulting water vapor will be dissipated from the windscreen by the airflow over the vehicle even at very low speeds.

Examples

Figure 1:
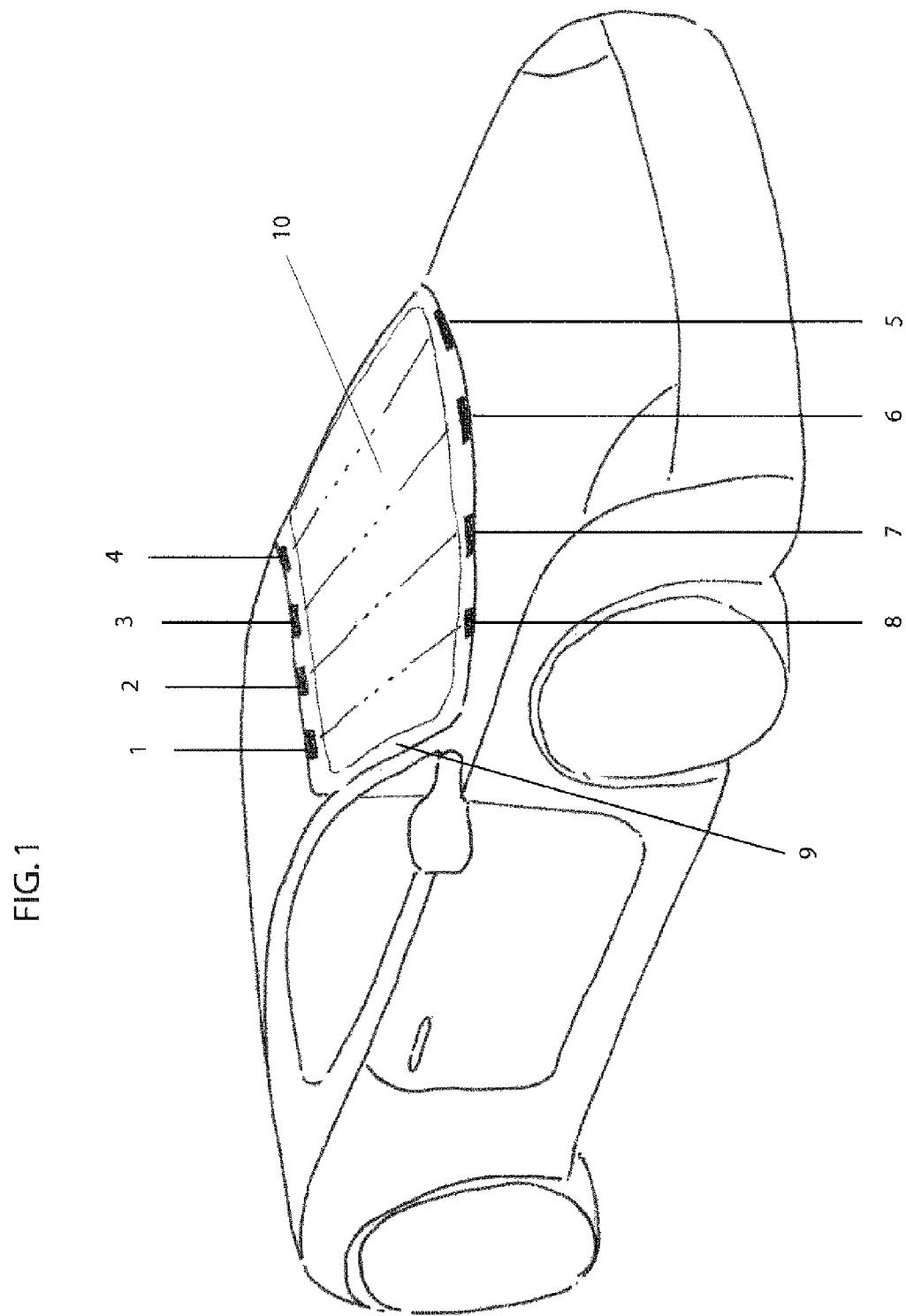
FIG. 1 is a schematic diagram of a vehicle the windscreen of which incorporates an embodiment of the invention.

Referring to FIG. 1, a vehicle 9 has a windscreen 10 to which piezo-electric transducers 1-8 are bonded. The transducers are for example Lead Zirconate Titanate (PZT) transducers. The transducers of this example are specifically designed with content and dimensions for maximum frequency and power effectiveness.

The system has one, or both, of automatic digital and manual controls for controlling the power and intensity of the ultrasound vibration. The power and intensity of the waves may be controlled in dependence on the intensity of the precipitation.

The device may also have the effect of heating the surface of the windscreen, using ultrasound energy, to allow for demisting and de-icing.

The system may be used with a conventional screen washer to clean the windscreen. However, this should be more efficient than the conventional system, as it can utilise the effectiveness of ultrasonic cleaning technology.

An embodiment of the present invention provides longitudinal or shear ultrasonic waves as the dominant wave modes. Other acoustic wave modes such as ultrasonic surface (Rayleigh) waves and/or Lamb waves that are guided within the thickness of the windscreen may also be present.

Figure 2:
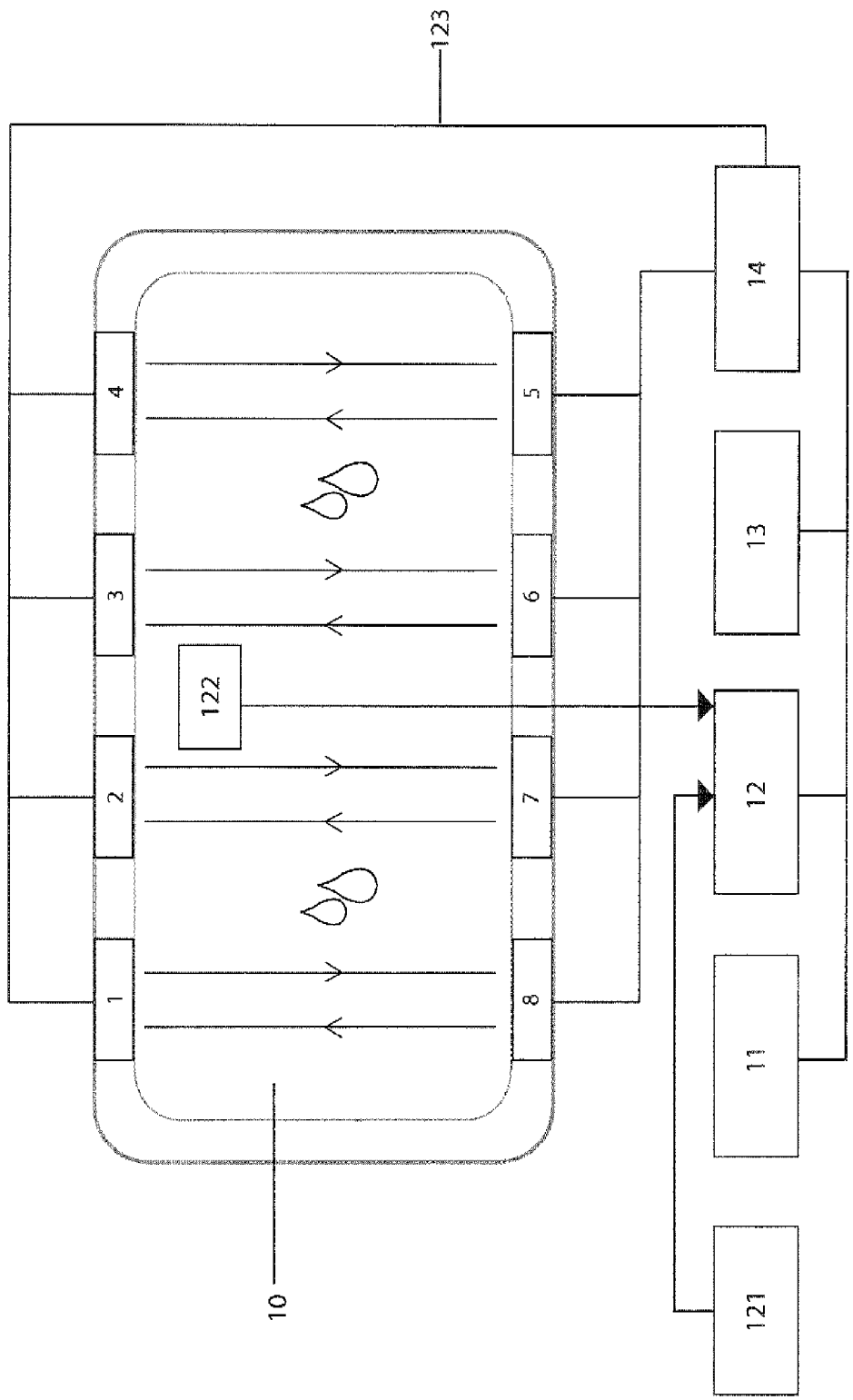
FIG. 2 is a schematic block diagram of a windscreen which incorporates an embodiment of the invention.

Referring to FIG. 2, a windscreen 10 has transducers 1 to 8 distributed around the edges of the windscreen. The transducers of this example are bonded directly to the screen 10 by epoxy resin or other suitable bonding agent. In this example the transducers are bonded to the top and bottom of the windscreen. Although not shown, transducers may be bonded to the sides of the screen. The transducers may be evenly distributed around the edges of the windscreen or unevenly distributed. For example, more transducers may be placed near to the driver's position than near to the passenger's position.

The transducers 1-8 are connected via wiring 123, which may comprise a wiring loom, to a driver system 11-14, which comprises a power supply 11, a control unit 12, a frequency generator 13, and a power amplifier 14. The power supply may comprise a normal 12 volt or 24 volt vehicle battery. The system may be controlled by a standard rain sensor 122 and/or manual controls 121. The PZT transducers and wiring may be masked from view by an opaque mask for example black vinyl plastic film.

Opposing transducers, e.g. the top and bottom transducers 1-8, may be independently driven either in phase or out of phase. All the transducers may preferably operate at the same frequency.

The ultrasound has a frequency well above the threshold of hearing for vehicle occupants (both human and other mammal e.g. canine). Embodiments of the invention operate in the range 0.5 to 5 MHz, for example 1 to 3 MHz. The frequency of the ultrasound is chosen to optimize the amplitude of vibration. The amplitude of the ultrasonic wave is chosen to vaporize precipitation.

Many different wave modes may be present; the most dominant ones will be longitudinal waves. The wave modes, include but are not limited to, transverse (shear), Lamb and Rayleigh waves.

The frequency and amplitude for a particular windscreen may be chosen by experiment and/or by using Finite Element Analysis. Also the dimensions of the PZT transducers may be selected using Finite Element Analysis. Finite Element Analysis takes account of: a). Young's Modulus; b). Density; c). Tan delta; d). Poisson's ratio; of each component layer of a laminated screen and for the epoxy resin bonding the transducers to the screen. The thicknesses of screen is also taken into account. Screens of different materials and thicknesses may require different insonification frequencies.

A conventional laminated windscreen has a total thickness about 6.4 mm. The dominant ultrasonic wave used to insonify it may have a frequency in the range 2 MHz plus or minus 1 MHz. The ultrasonic wave may have a frequency in the range 2 MHz plus or minus 0.5 MHz.

Variants

The system may be used on a visor 30 as used for example by motorcyclists. As shown in FIG. 3 the visor 30 has transducers 31-33 fixed to it. The transducers are piezoelectric transducers as described with reference to FIG. 2. The transducers may be driven by a drive system 11 to 14 as described with reference to FIG. 2. The transducers of FIG. 3 are connected to the drive system by a plug and socket 36. The transducers may be bonded directly to the visor or, as shown bonded to a clip 34 which clips onto the top edge of the visor.

The system may be used for clearing precipitation from windows of buildings and/or for the automatic cleaning of windows of buildings, for example large multi-story buildings.

Whilst three transducers are shown in FIG. 3 and eight transducers are shown in FIG. 2, any suitable number of transducers may be used.

Advantages

The system has no visible or moving parts and uses a frequency which is above audible levels for humans or animals. It is therefore effectively completely silent.

It is estimated that in volume production the cost of the system is potentially cheaper than the conventional wiper system of vehicles.

One hundred million wiper blades are replaced in USA alone per year resulting in 3,138,767 lbs. of rubber blades wasted in USA per year. In 2009, the world car annual sales were 44,686,149 as against America's sales of 5,440,429. Therefore, it could be assumed that for cars and light commercial vehicles (excluding trucks and medium commercial vehicles) the amount of wiper rubber not recycled could be up to 11,509,35 tons of waste rubber per year.

The system is intended to give a clear field of view for the driver and passenger, when driving through heavy rain for example.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of clearing precipitation from a surface of a window, the method comprising ultrasonically vaporizing the precipitation using an ultrasonic wave produced by one or more piezoelectric transducers distributed around one or more edges of the window, wherein the one or more piezoelectric transducers insonify the window with the ultrasonic wave, wherein ultrasonic wave is one or more of a surface wave, a Rayleigh wave and a Lamb wave having a frequency in the range 0.5 to 5 MHz.

2. The method of claim 1, wherein the window is a windscreen or other window of a vehicle.

3. The method of claim 1, wherein the window is a visor.

4. The method of claim 1, wherein the window is a window of a building.

5. The method of claim 1, wherein the one or more piezoelectric transducers are bonded to the window.

6. The method of claim 1, wherein at least one of the one or more piezoelectric transducers comprises a Lead Zirconite Titanate transducer.

7. The method of claim 1, wherein the precipitation is rain, drizzle, ice or snow.

8. The method of claim 1, wherein the ultrasonic wave is configured to reduce a surface tension between the surface of the window and the precipitation.

9. The method of claim 1, wherein the ultrasonic wave has a frequency in the range of 1 MHz to 3 MHz.

10. The method of claim 1, wherein the ultrasonic wave has a frequency in the range of 1.5 MHz to 2.5 MHz.

11. An apparatus for clearing precipitation from a surface of a window, the apparatus comprising: from the surface of the sheet
one or more piezoelectric transducers configured to be distributed around one or more edges of the window, wherein the one or more piezoelectric transducers are configured produce an ultrasonic wave to insonify the window with the ultrasonic wave to ultrasonically vaporize the precipitation, wherein the ultrasonic wave is one or more of a surface wave, a Rayleigh wave and a Lamb wave having a frequency in the range 0.5 to 5 MHz.

12. The apparatus of claim 11, wherein the window is at least one of a windscreen or other window for a vehicle.

13. The apparatus of claim 11, wherein the window is a visor.

14. The apparatus of claim 11, wherein the window is a window for a building.

15. The apparatus of claim 11, further comprising the window, and wherein the one or more piezoelectric transducers are bonded to the window.

16. The apparatus of claim 11, wherein at least one of the one or more piezoelectric transducers comprises a Lead Zirconite Titanate transducer.

17. The apparatus of claim 11, further comprising an ultrasonic signal generator coupled to at least one of the one or more piezoelectric transducers, wherein the signal generator is configured to stimulate the at least one of the one or more piezoelectric transducers to emit the ultrasonic wave.

18. The apparatus of claim 11, wherein the ultrasonic wave has a frequency in the range of 1 MHz to 3 MHz.

19. The apparatus of claim 11, wherein the ultrasonic wave has a frequency in the range of 1.5 MHz to 2.5 MHz.

* * * * *